United States Patent
He et al.

(10) Patent No.: US 7,834,779 B2
(45) Date of Patent: *Nov. 16, 2010

(54) SYSTEM AND METHOD FOR INCREASING VISIBILITY OF CRITICAL FLIGHT INFORMATION ON AIRCRAFT DISPLAYS

(75) Inventors: Gang He, Morristown, NJ (US); Thea L. Feyereisen, Hudson, WI (US); Aaron J. Gannon, Anthem, AZ (US); Blake W. Wilson, Peoria, AZ (US); Jary E. Engels, Peoria, AZ (US); Ivan S Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/170,498

(22) Filed: Jun. 29, 2005

(65) Prior Publication Data

US 2009/0207048 A1    Aug. 20, 2009

(51) Int. Cl.
  *G01C 23/00* (2006.01)
(52) U.S. Cl. .......................... 340/973; 340/974; 701/14
(58) Field of Classification Search ................. 340/973, 340/972, 974, 975, 976, 980; 701/4, 14
See application file for complete search history.

(56) References Cited

U.S. PATENT DOCUMENTS

| 4,040,005 | A | * | 8/1977 | Melvin | 340/973 |
|---|---|---|---|---|---|
| 4,147,056 | A | * | 4/1979 | Muller | 340/972 |
| 4,247,843 | A | * | 1/1981 | Miller et al. | 340/973 |
| 4,554,545 | A | * | 11/1985 | Lowe | 340/980 |
| 5,185,606 | A | * | 2/1993 | Verbaarschot et al. | 340/975 |
| 5,289,185 | A | * | 2/1994 | Ramier et al. | 340/971 |
| 5,798,713 | A | * | 8/1998 | Viebahn et al. | 340/974 |
| 6,054,937 | A | * | 4/2000 | Von Viebahn et al. | 340/974 |
| 6,057,786 | A | | 5/2000 | Briffe et al. | |
| 6,867,711 | B1 | * | 3/2005 | Langner et al. | 340/973 |
| 6,892,118 | B1 | * | 5/2005 | Feyereisen | 701/14 |
| 6,985,801 | B1 | * | 1/2006 | Straub et al. | 701/4 |
| 7,216,069 | B2 | * | 5/2007 | Hett | 701/14 |
| 7,283,064 | B2 | * | 10/2007 | He | 340/973 |
| 2002/0039070 | A1 | | 4/2002 | Ververs et al. | |
| 2003/0132860 | A1 | * | 7/2003 | Feyereisen et al. | 340/973 |
| 2005/0057377 | A1 | | 3/2005 | Naimer et al. | |
| 2005/0066275 | A1 | | 3/2005 | Gannon | |

OTHER PUBLICATIONS

PCT Search Report dated Jun. 16, 2008, PCT/US2006/025743.

* cited by examiner

*Primary Examiner*—John A Tweel, Jr.
(74) *Attorney, Agent, or Firm*—Ingrassia Fisher & Lorenz, P.C.

(57) ABSTRACT

System and method increase the visibility of critical flight information on electronic displays. An aircraft display system includes a processing unit, a flight management system, a navigation system, a database for storing target data and terrain data, a graphics display generator, and a visual display. The flight management system and/or the navigation system provide real-time aircraft operational and flight control information. The processing unit directs the graphics display generator to generate graphic control signals for the visual display, which increase the transparency of a segment of a zero pitch reference line in the vicinity of a flight path marker on the display.

26 Claims, 4 Drawing Sheets

SYSTEM AND METHOD FOR INCREASING VISIBILITY OF CRITICAL FLIGHT INFORMATION ON AIRCRAFT DISPLAYS

FIELD OF THE INVENTION

The present invention relates generally to the field of display systems, and more specifically, but not exclusively, to a system and method for increasing the visibility of critical flight information on aircraft displays and similar types of electronic displays for other types of vehicles, such as spacecraft, unmanned air vehicles and associated ground stations, submarines, etc.

BACKGROUND OF THE INVENTION

Computer generated aircraft displays have become highly sophisticated and are capable of displaying a substantial amount of flight management, navigation and control information, which gives flight crews more effective control of their aircraft and helps to reduce their workload. This reduction in flight crew workload results in fewer pilot errors and thus enhances flight safety. In this regard, electronic displays, such as Heads-Up Displays (HUDs) and Heads-Down Displays (HDDs), are used in aircraft as Primary Flight Displays to display important flight management, navigation and control information to flight crews.

Primary Flight Displays are computer generated displays that provide flight crews with real-time visual representations of the operational states of their aircraft during flights. For example, an existing Primary Flight Display combines critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and thus improving flight safety overall.

Modern Primary Flight Displays are designed to integrate substantial amounts of flight management, navigation and control information from numerous, diverse sources into one comprehensible display. Such an integrated display includes important flight management, navigation and control information representing, for example, an aircraft's attitude, flight path, airspeed, altitude, terrain features, conformal airport, runway or target information, traffic information, situational awareness information, etc. The primary purpose for providing this vast amount of flight management, navigation and control information in a single display is to increase the flight crews' overall awareness of the current status of their aircrafts' operations and controls. Therefore, an important requirement imposed on the design of Primary Flight Displays is that they provide a balanced presentation of the diverse flight management, navigation and control information displayed to flight crews, in order to improve and ensure the effectiveness and accuracy of the decisions being made.

Certain flight information, such as an aircraft's current pitch, heading, flight path, and target information, is critically important for maintaining proper aircraft safety and control. However, a significant problem that exists with prior art Primary Flight Displays and similar types of displays is that the visual symbols representing this critical flight information are typically displayed at or near the same locations (e.g., in the center) of the display, and some of these symbols can overlap and obscure the view of others. For example, critical pitch and heading information can appear behind a flight path marker on a prior art Primary Flight Display. Consequently, a pilot's view of that pitch and heading information, and any targets or terrain features in that region, can be obscured by the flight path marker on the display, which decreases the effectiveness and accuracy of the flight decisions being made. An example of such a problem is illustrated in FIG. 1, which depicts an existing Primary Flight Display (and similar electronic aircraft displays).

Referring to FIG. 1, display 100 represents a prior art electronic display, such as, for example, a Primary Flight Display in an onboard electronic display system for an aircraft (e.g., HDD). Display 100 shows, among other things, computer generated symbols representing a zero pitch reference line (e.g., commonly referred to as a horizon line) 102, two heading indicators 104a and 104b, a flight path marker (also known as a flight path vector or velocity vector) 106, an airport runway 108, an airspeed scale or tape 110, an altitude scale or tape 112, and terrain (e.g., identified generally as element 113). Essentially, as an aircraft approaches an airport for landing, the pilot locates the intended target (runway 108, in this illustrative example) on display 100, and aims the aircraft in the direction of the target (runway 108). The pilot aims the aircraft at the target, by flying a flight director guidance cue and using the lateral and vertical deviation indications (in addition to target airspeed, etc.) to control the aircraft's movement, which results (among other things) in the target remaining in the close vicinity of the flight path marker symbol 106. All the while, the pilot attempts to keep monitoring the other critical flight information on the display, by viewing such critical flight information symbols representing, for example, the zero pitch reference line 102, the heading (course, track, etc.) indicators 104a and 104b, the digital readouts on the airspeed tape 110 and altitude tape 112, and any other important target information (e.g., approaching aircraft, lateral and vertical deviation information, flight path guidance cue information, etc.) or terrain information (e.g., natural or man-made elevated obstacles) being displayed. Alternatively, if a HUD is being used, the pilot may see an actual runway and/or targets through the HUD screen, along with the overlaid computer generated flight information symbols being displayed.

Notwithstanding the distinct advantages of the use of Primary Flight Displays and similar electronic displays in modern aircraft, display 100 in FIG. 1 illustrates a significant drawback of these types of displays. Specifically, some of the flight information symbols being displayed can overlap other flight information symbols, and the overlapping symbols can obscure the pilot's view of the critical flight information that the pilot needs to see. For example, referring to FIG. 1, a significant portion (e.g., identified generally as "segment" 114) of the zero pitch reference line 102, the underlying terrain (e.g., identified generally as element 115) in that region, and an underlying target (e.g., runway 108) are obscured by the overlap of flight path marker 106. When approaching a runway, multiple flight symbols, such as, for example, heading select symbol, track select symbol, heading readout numbers, heading scales, etc. would typically appear in the vicinity of the flight path marker, thus causing significant visual clutter. Also, as indicated by the compass reading 116, a heading indicator (e.g., "16") should be displayed approximately halfway between heading indicators 104a ("15") and 104b ("17") on the zero pitch reference line 102. However, by its absence, it is apparent that this heading indicator ("16") is completely obscured by the overlap of flight path marker 106.

Additionally, FIG. 1 shows that the stroke symbology (e.g., zero pitch reference line 102) that coincides with airspeed tape 110 and altitude tape 112 (e.g., identified generally as elements 118 and 120) can interfere with the readings of airspeed and altitude information on these tapes, and can also obscure the pilot's view of any underlying terrain features, targets, or other critical flight information that might be displayed "behind" those tapes. As such, this loss of visual contact of such critical flight information by a pilot decreases the effectiveness and accuracy of the flight decisions being made, and thus increases the possibility that flight management, navigation or control errors can occur. Therefore, it would be advantageous to have a system and method that increases the visibility of critical flight information on an electronic display, such as, for example, a Primary Flight Display, similar electronic aircraft displays, and other types of electronic displays. As described in detail below, the present invention provides such a system and method, which resolves the critical flight information visibility problems encountered by flight crews or operators with existing Primary Flight Displays and other types of prior art electronic displays.

SUMMARY OF THE INVENTION

The present invention provides an improved system and method for increasing the visibility of critical flight information on electronic displays, such as, for example, Primary Flight Displays and similar types of aircraft displays, and also electronic displays for spacecraft, unmanned air vehicles (UAVs) and associated ground stations, submarines, etc. In accordance with a preferred embodiment of the present invention, an aircraft display system is provided that includes a processing unit, a flight management system, a navigation system, a database for storing target data and terrain data, a graphics display generator, and a visual display. The flight management system and/or the navigation system provide real-time aircraft operational and flight control information. The processing unit directs the graphics display generator to generate graphic control signals for the visual display, which increase the transparency of a segment of a zero pitch reference line in the vicinity of a flight path marker on the display. Thus, critical flight information in the vicinity of the flight path marker is not obscured by the zero pitch reference line displayed in that vicinity, which enhances a flight crew's situational awareness and facilitates aircraft control. The processing unit also increases the transparency of any flight path information indicator (e.g., heading, course, track indicator) that is located near the generated segment of the zero pitch reference line, and the transparency of the zero pitch reference line where it coincides with any flight information tape or scale (e.g., airspeed tape, altitude tape, etc.) being displayed. Consequently, critical flight information near the segment of the zero pitch reference line in the vicinity of the flight path marker is not obscured by the flight path information indicator being displayed in that vicinity, and the readings on the flight information tapes are not obscured by the zero pitch reference line.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
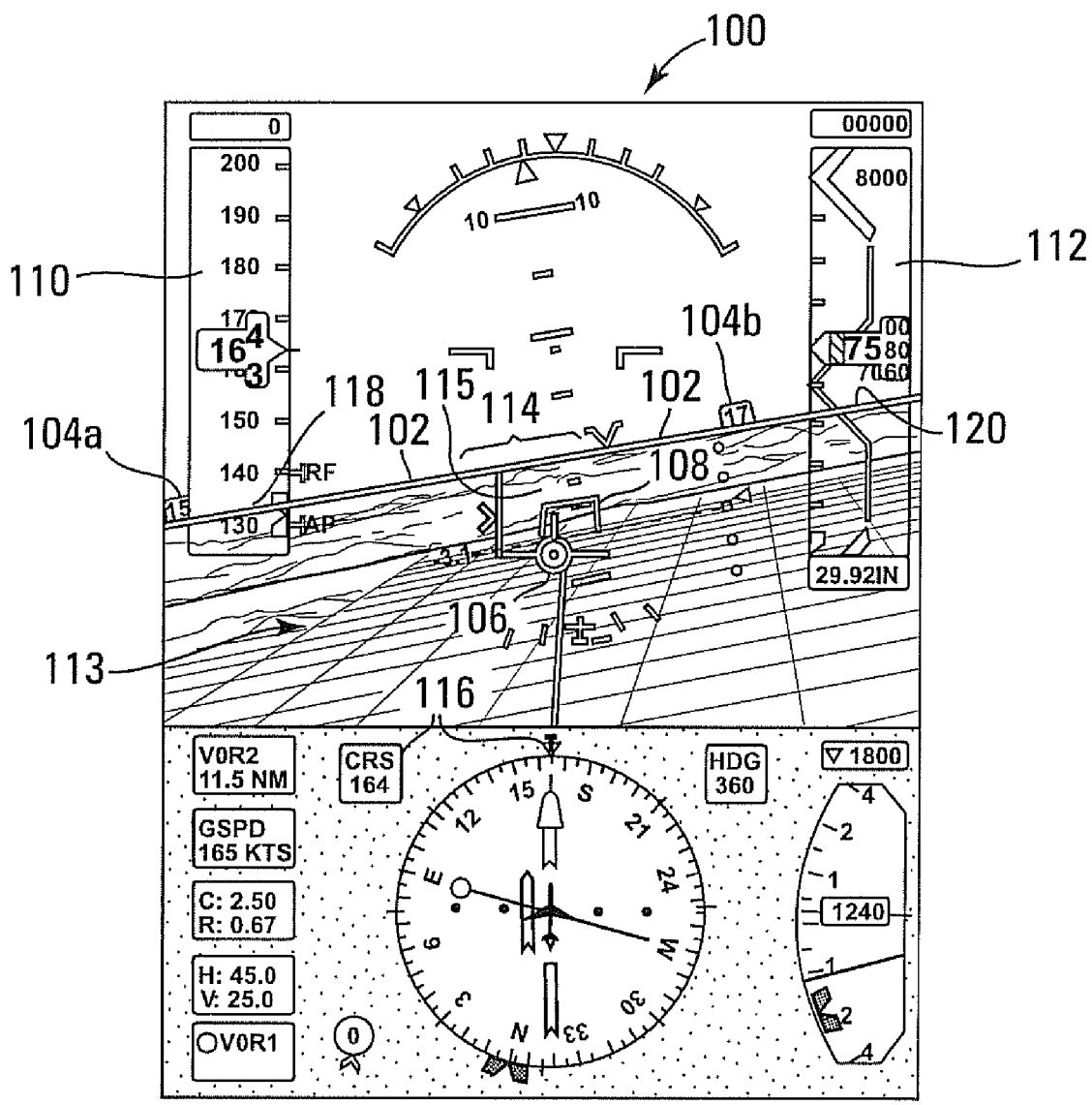
FIG. 1 depicts a pictorial representation of a prior art electronic aircraft display, which illustrates certain drawbacks of existing Primary Flight Displays and similar electronic displays.
Figure 2:
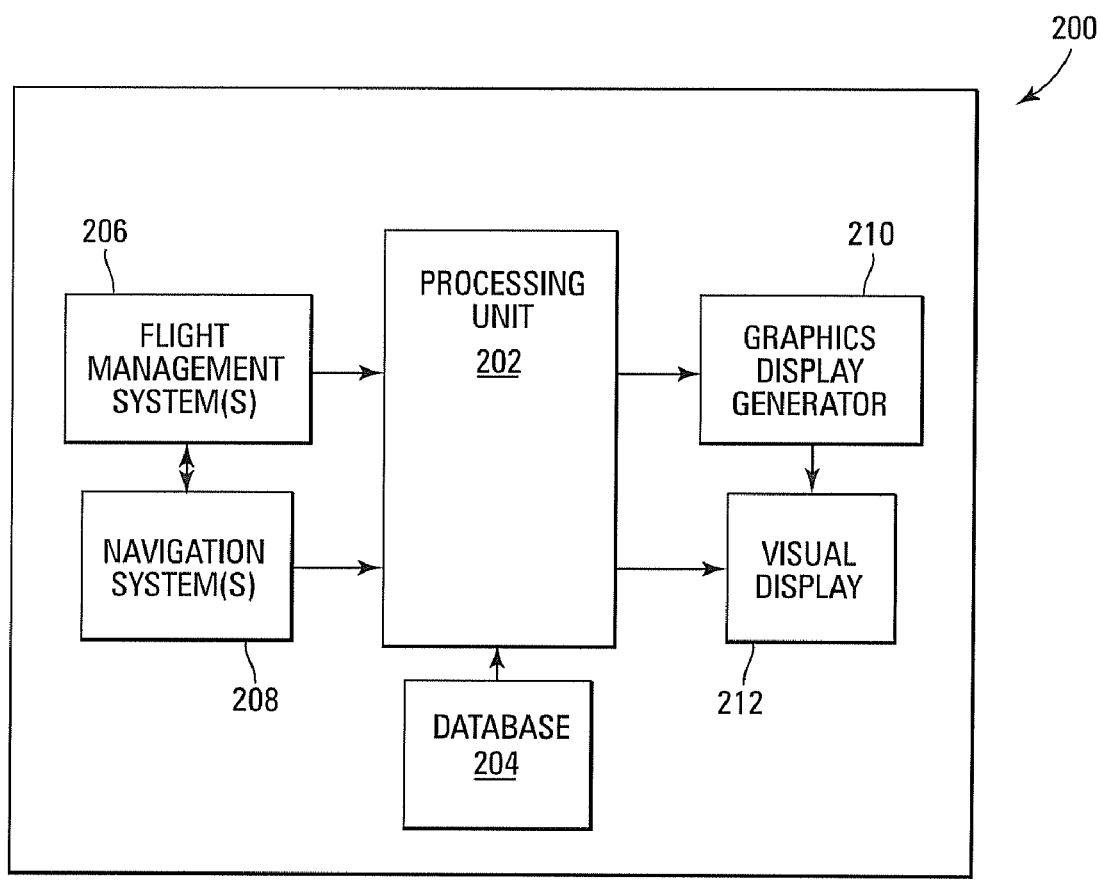
FIG. 2 depicts a block diagram of an example system for increasing the visibility of critical flight information on an aircraft display, which can be used to implement a preferred embodiment of the present invention.

With reference now to the figures, FIG. 2 depicts a block diagram of an example system 200 for increasing the visibility of critical flight information on an aircraft display, which can be used to implement a preferred embodiment of the present invention. For this example, system 200 includes a processing unit 202, a database 204, a flight management system 206, a navigation system 208, a graphics display generator 210, and a visual display 212. Notably, it should be understood that although system 200 appears in FIG. 2 to be arranged as an integrated system, the present invention is not intended to be so limited and can also include an arrangement whereby one or more of processing unit 202, database 204, flight management system 206, navigation system 208, graphics display generator 210, and visual display 212 is a separate component or a subcomponent of another system located either onboard or external to an aircraft. Also, for example, system 200 can be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present invention is not limited to aircraft displays, and system 200 can also be implemented for other types of electronic displays, such as, for example, spacecraft displays, unmanned vehicle and associated ground station displays, submarine displays, etc.

For this embodiment, processing unit 202 can be a computer processor such as, for example, a microprocessor, digital signal processor, or any suitable processor capable of at least receiving and/or retrieving aircraft flight management information (e.g., from flight management system 206), navigation and control information (e.g., from navigation system 208), target and/or terrain information (e.g., from database 204), generating display control signals for a visual display of the aircraft flight management information, the navigation and control information (including, for example, a zero pitch reference line, one or more heading indicators, tapes for airspeed and altitude, etc.), target and/or terrain information, and a flight path marker (or similar type of aircraft aiming symbol), and sending the generated display control signals to a graphics display generator (e.g., graphics display generator 210) associated with a visual display (e.g., visual display 212).

For example, processing unit 202 can be arranged as a single processor or plurality of processors connected to a data communications bus or system bus. A memory controller/cache can also be connected to the data communications bus or system bus, which can provide an interface between processing unit 202 and a local memory (e.g., RAM, ROM, etc.). A plurality of machine instructions can be stored in the local memory and retrieved and operated on by processing unit 202 to generate the control signals for the graphics display generator 210 and visual display 212. An Input/Output (I/O) bus bridge can also be connected to the data communications bus or system bus, which can provide an interface between processing unit 202 and an I/O bus. Thus, processing unit 202 can receive, retrieve and/or send data via such an I/O bus. In any event, those of ordinary skill in the art will appreciate that the hardware described herein for processing unit 202 in FIG. 2 may vary. As such, the depicted example is provided for illustrative purposes and not meant to imply any architectural limitations with respect to the present invention.

For this example embodiment, system 200 also includes database 204 coupled to processing unit 202 (e.g., via an I/O bus connection). For example, database 204 can be a memory device (e.g., non-volatile memory, disk, drive, tape, optical storage device, mass storage device, etc.) that can store digital target location data and terrain data (e.g., latitudinal and longitudinal data) as either absolute coordinate data or as a function of an aircraft's position. A source for the digital target location data and/or terrain data stored in database 204 can be, for example, a United States Geological Survey (USGS) map having a resolution of approximately 90 meters, which includes topographical relief information that can be used to apply grid lines following the contour of terrain. As such, database 204 can store a target location database that includes data defining the actual geographical boundaries of numerous airports and runways.

Database 204 can also include, for example, a terrain database, which can include the locations and elevations of natural terrain obstacles such as mountains or other elevated ground areas, and also the locations and elevations of man-made obstacles such as radio antenna towers, buildings, bridges, etc. A terrain database stored in database 204 can also include, for example, the boundaries of restricted airspace, restricted elevations for particular airspace, bodies of water, etc. As yet another example, a terrain database stored in database 204 can be a Jeppesen-styled database, which can cover a 300 by 270 mile area of terrain and include topographical relief information. As still another example, airport and runway location data and terrain data stored in database 204 can be received from an onboard device that senses and maps man-made obstacles (e.g., airports, runways, etc.) and variations in terrain, such as, for example, a Forward Looking Infrared (FLIR) sensor, or an active or passive type of radar device. As another example, airport and runway location data, and other types of high priority target data (e.g., locations of incoming traffic to avoid, constructed waypoints, obstacles in the aircraft's flight path, etc.) can be retrieved and/or received by processing unit 202 from a suitable source of such data, such as, for example, an onboard flight management system database (e.g., a component of flight management system 206), an onboard navigation database (e.g., a component of navigation system 208), an onboard FLIR sensor or radar device, or an external database (e.g., via a data communication up-link).

For this embodiment, system 200 also includes flight management system 206 and navigation system 208 coupled to processing unit 202 (e.g., via a respective I/O bus connection). Notably, flight management system 206 and navigation system 208 are depicted as separate components in the example embodiment of system 200. Alternatively, flight management system 206 and navigation system 208 and/or their functions of flight management, navigation and control can be combined in one system (e.g., in flight management system 206), or navigation system 208 can be a subsystem of flight management system 206. In any event, flight management system 206 and/or navigation system 208 can provide navigation data associated with the aircraft's current position and flight direction (e.g., heading, course, track, etc.) to processing unit 202. As such, navigation system 208 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from flight management system 206. The navigation data provided to processing unit 202 can also include information about the aircraft's airspeed, altitude (e.g., relative to sea level), pitch, and other important flight information if such information is desired. In any event, for this example embodiment, flight management system 206 and/or navigation system 208 can include any suitable position and direction determination devices that are capable of providing processing unit 202 with at least an aircraft's current position (e.g., in latitudinal and longitudinal form), the real-time direction (heading, course, track, etc.) of the aircraft in its flight path, and other important flight information (e.g., pitch, airspeed, altitude, attitude, etc.).

For this embodiment, system 200 also includes graphics display generator 210 coupled to processing unit 202 (e.g., via an I/O bus connection) and visual display 212. Visual display 212 can also be coupled to processing unit 202 (e.g., via an I/O bus connection). For example, visual display 212 may include any device or apparatus suitable for displaying various types of computer generated symbols and information representing at least pitch, heading, flight path, airspeed, altitude, targets, terrain and flight path marker data in an integrated, multi-color or monochrome form. Using aircraft position and direction (e.g., heading, course, track, etc.) data retrieved (or received) from flight management system 206 and/or navigation system 208, and pitch data retrieved (or received) from flight management system 206 and/or navigation system 208, processing unit 202 executes one or more algorithms (e.g., implemented in software) for determining the position of a flight path marker, a zero pitch reference line, and heading (course, track, etc.) indicators on visual display 212. Processing unit 202 also determines whether or not any portion of the zero pitch reference line and any of the heading indicators will correspond (and be collocated) with the flight path marker and the airspeed and altitude tapes on visual display 212. Processing unit 202 then generates a plurality of display control signals representing the flight path marker, zero pitch reference line, heading indicators, and airspeed and altitude tapes (along with target and terrain data from database 204), and sends the plurality of display control signals to visual display 212 via graphics display generator 210. Preferably, for this embodiment, visual display 212 is an aircraft cockpit, multi-color display (e.g., a Primary Flight Display). Graphics display generator 210 interprets the received plurality of display control signals and generates suitable flight path marker, zero pitch reference line, heading indicator, airspeed tape, altitude tape, target, and terrain symbols, which are presented on a screen or monitor of visual display 212.

Notably, although an existing cockpit display screen may be used to display the above-described flight information symbols and data, the present invention is not intended to be so limited and can include any suitable type of display medium capable of visually presenting multi-colored or monochrome flight information for a pilot or other flight crew member. As such, many known display monitors are suitable for displaying such pitch, heading, airspeed, altitude, flight path marker, target and terrain information, such as, for example, various CRT and flat-panel display systems (e.g., CRT displays, LCDs, OLED displays, plasma displays, projection displays, HDDs, HUDs, etc.). For example, visual display 212 can be implemented as a heads-down Primary Flight Display by a DU-1080 Display Unit or DU-1310 Display Unit, which are color active matrix LCD-based devices produced by Honeywell International, Inc. of Morristown, N.J. Also, an example HUD that can be used for visual display 212 is the HUD2020 device also produced by Honeywell International, Inc.

Figure 3:
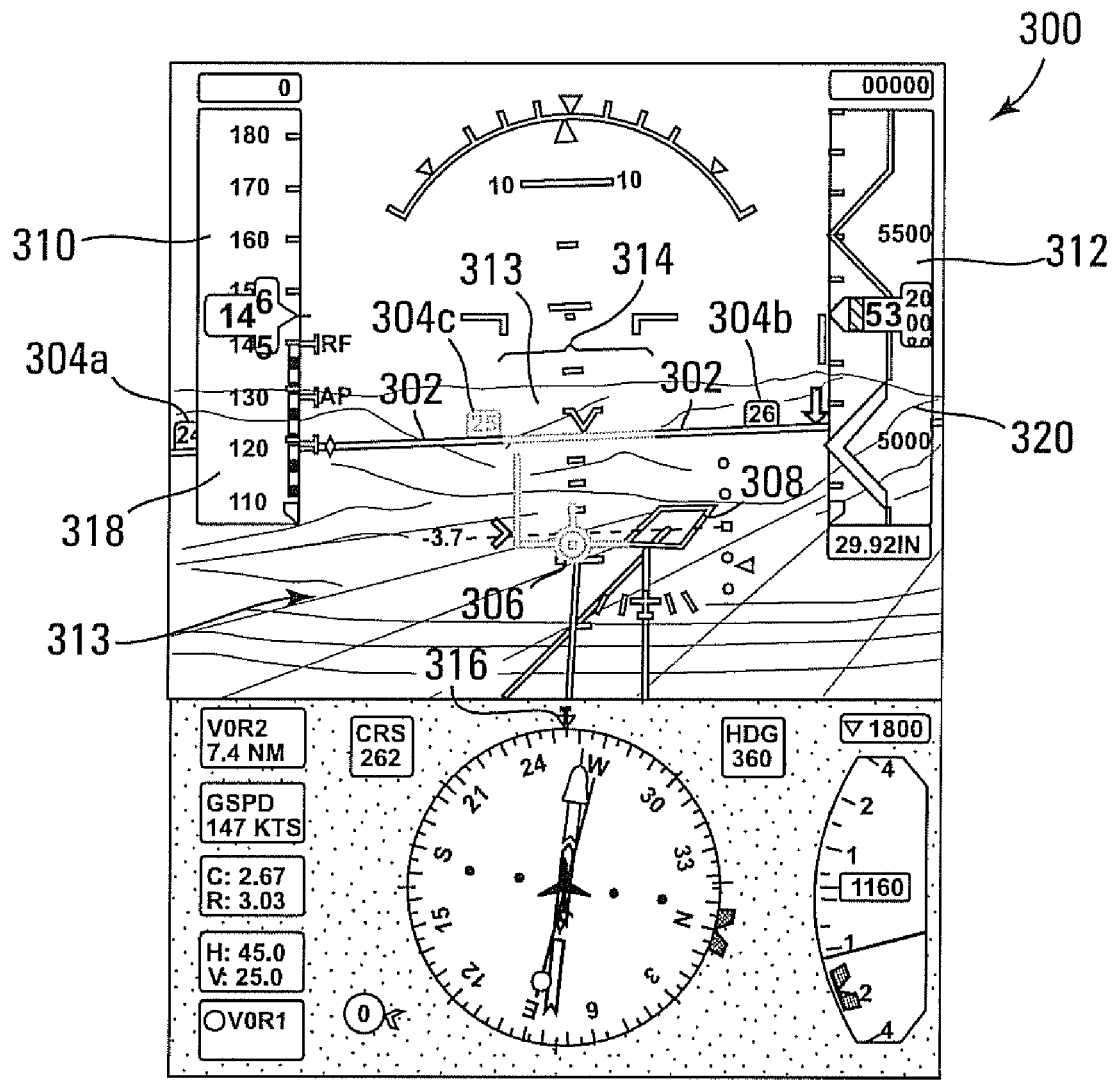
FIG. 3 depicts a pictorial representation of a visual display (e.g., presentation for visual display 212 in FIG. 2), which includes a visual representation of an onboard aircraft display that illustrates a preferred embodiment of the present invention.

For this example embodiment, graphics display generator 210 can be configured to provide flight path marker, zero pitch reference line, heading indicator, airspeed tape, altitude tape, target, and terrain data and symbols to a screen or monitor of visual display 212 (e.g., responsive to operations of processing unit 202). The target data may include, for example, data from a navigation database, traffic and collision avoidance system, up-linked data from an external database, data from a FLIR sensor or radar device, and/or any other suitable source of flight information useful to a pilot or other flight crew member. The pitch, heading, airspeed, altitude and flight path marker data may include, for example, data from an onboard inertial guidance system, navigation system, flight management system, etc. For this embodiment, graphics display generator 210 (e.g., responsive to operations of processing unit 202) may render a multi-colored or monochrome image of a flight path marker symbol (e.g., circular symbol), zero pitch reference line symbol, heading indicator symbols, airspeed and altitude tape symbols, and target symbols (e.g., defined by a location and boundary of an airport, runway, another aircraft, etc.) on a screen of visual display 212, along with relevant navigation information (e.g., suitable symbols representing locations of man-made obstacles and natural obstacles, etc.). Graphics display generator 210 (e.g., responsive to operations of processing unit 202) may also render multi-colored or monochromatic images of terrain and weather data on the screen of visual display 212. Notably, in accordance with the principles of the present invention, the transparency of some of the pitch and heading information symbols displayed on the screen of visual display 212 may be increased or decreased responsive to a suitable algorithm (e.g., implemented in software) executed by processing unit 202, which functions to increase the visibility of the heading information and the other important flight information (e.g., underlying targets, and airspeed and altitude data) being displayed. FIG. 3 depicts a pictorial representation of a visual display, which illustrates such functions of a dynamic flight information (e.g., pitch and heading) symbol display.

Referring to FIG. 3, a pictorial representation of a visual display 300 (e.g., presentation for visual display 212 in FIG. 2) is shown, which includes a visual representation of an onboard aircraft display that illustrates a preferred embodiment of the present invention. For this example embodiment, visual display 300 can be a heads-down Primary Flight Display. However, the present invention is not intended to be so limited and can also be implemented with any suitable type of electronic aircraft display (e.g., HUD) that can display important flight information (e.g., pitch, heading, course, track, airspeed, altitude, targets, terrain, aiming symbols, etc.). For example, an airport symbol (not shown) can be displayed when an aircraft is higher than 1,000 feet above ground level (AGL) or positioned at a significant distance from the airport involved, because the relative size of the airport makes it visible from that altitude or distance. However, as the aircraft approaches the airport, the runway symbol 308 appears (e.g., as illustrated in display 300), and the airport symbol is typically removed from the display.

When the aircraft is at a particular distance from the airport, the pilot begins to aim the aircraft at a selected portion of the runway (e.g., target) 308. Essentially, the pilot flies a flight director guidance cue and uses the lateral and vertical deviation indications (in addition to target airspeed, etc.) to control the aircraft's movement, which results (among other things) in the target or runway 308 remaining in the close vicinity of the flight path marker (flight path vector, velocity vector) 306. For this example embodiment, display 300 also provides, among other things, a visual representation of critical flight information such as a zero pitch reference line (e.g., stroke symbology) 302, a plurality of heading indicators 304a-304c, an airspeed tape (or scale) 310, an altitude tape (or scale) 312, and terrain (e.g., identified generally as element 313). Flight path information corresponding to heading information is also displayed on compass 316. As such, for this example, it may be assumed that an aircraft including visual display 300 is on approach to runway 308 in order to land the aircraft. Consequently, it may be assumed that the pilot is controlling the flight path or track of the aircraft, and attempting to aim the aircraft at the near end of runway 308.

Importantly, in accordance with principles of the present invention, note that the transparency of a section (e.g., identified as a "gap") 314 of zero pitch reference line 302 has been increased (e.g., by operations of processing unit 202 in FIG. 2) so that the underlying portions of terrain 313 and underlying target(s), if any, in the vicinity of flight path marker 306 are not obscured by zero pitch reference line 302. Also, in accordance with principles of the present invention, note that the transparency of heading indicator 304c has been increased, in order to minimize visual clutter in the vicinity of gap 314 and still display the important flight information involved (e.g., heading indication "25"). Furthermore, in accordance with principles of the present invention, note that the transparency of the zero pitch reference line 302 has been increased where zero pitch reference line 302 coincides with airspeed tape 310 and altitude tape 312 (e.g., in the regions respectively identified as elements 318 and 320). Thus, important flight information such as, for example, airspeed and altitude readings, and underlying terrain and target information, are not obscured by zero pitch reference line 302. Therefore, the present invention's dynamic control of the transparency of important flight information symbology, such as, for example, pitch and heading information symbols, enhances the ability of the pilot to aim the aircraft at runway 308, and also allows the pilot to continuously monitor other flight path management, terrain and target information on the display, which reduces pilot workload and navigation and control errors, and also results in increased flight safety.

Figure 4:
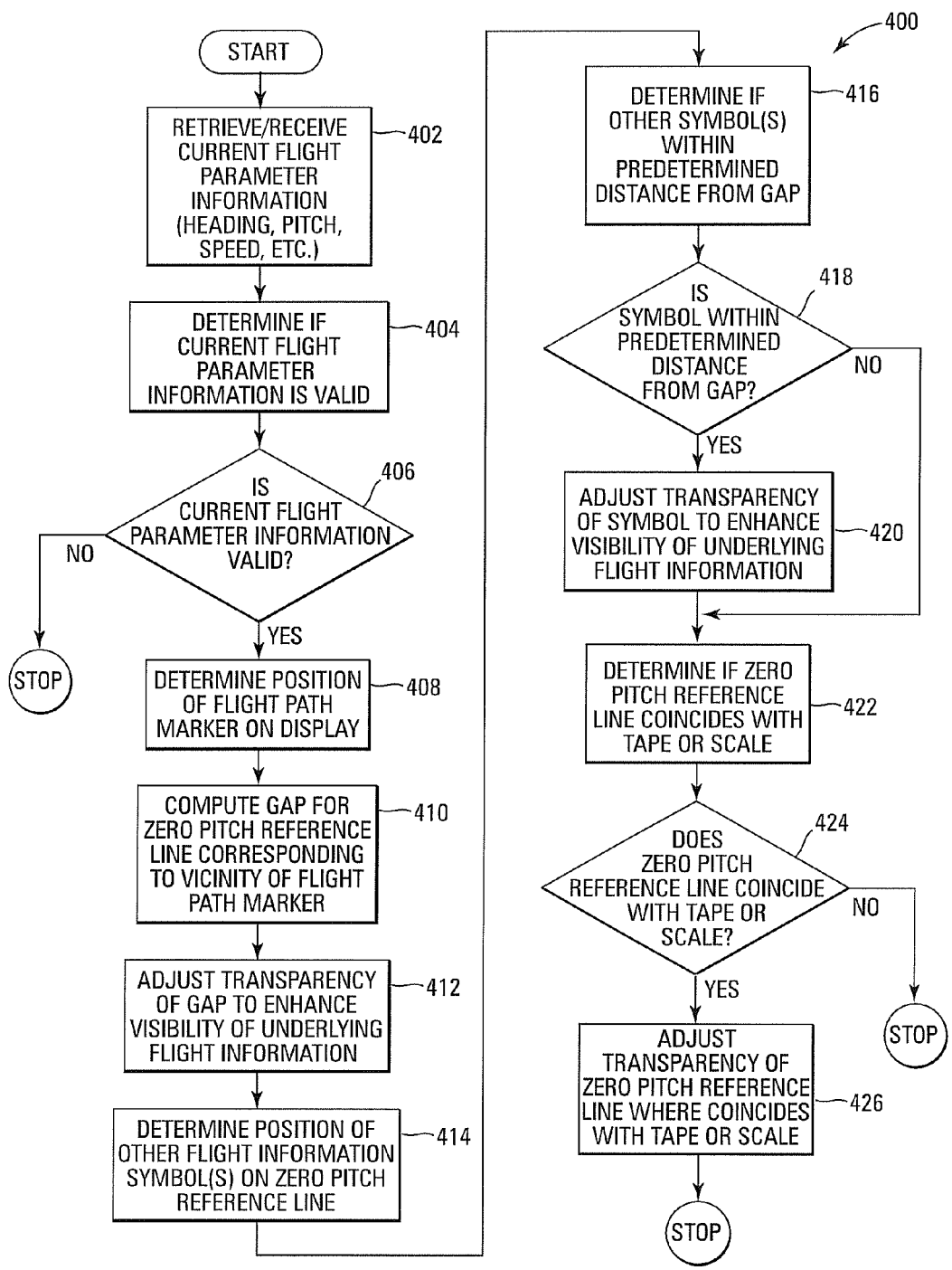
FIG. 4 depicts a flow chart showing an exemplary method for increasing the visibility of critical flight information on an electronic display, in accordance with a preferred embodiment of the present invention.

FIG. 4 depicts a flow chart showing an exemplary method 400 for increasing the visibility of critical flight information on an electronic display, in accordance with a preferred embodiment of the present invention. Referring to Figures 2-4, for this example, processing unit 202 receives (or retrieves) current flight parameter information (e.g., current heading, pitch, speed, etc.) for an aircraft involved (step 402). For example, the aircraft's current flight parameter data can be provided by flight management system 206 and/or navigation system 208. Processing unit 202 can then determine whether or not the received (or retrieved) current flight parameters are valid information (step 404). For example, processing unit 202 can execute one or more suitable algorithms (e.g., implemented in software) to determine the validity of the received (or retrieved) flight parameter data, by comparing that data with earlier received data (e.g., stored in database 204) and using a predictive technique to compute, for example, the likelihood that the current data is valid. Alternatively, for example, processing unit 202 can execute one or more suitable algorithms that are designed primarily for determining the validity of current flight parameter data for an aircraft during flight. In any event, if processing unit 202 determines that any of the received (or retrieved) current flight parameter information is invalid (step 406), the flow is terminated. However, if (at step 406) processing unit 202 determines that the received (or retrieved) current flight parameter information is valid, then processing unit 202 determines the position or location of an aircraft aiming symbol (e.g., flight path marker 306) on an electronic display (e.g., visual display 212) being used for the aircraft involved (step 408). For example, processing unit 202 can retrieve the location information for the aiming symbol from flight management system 206, navigation system 208, and/or database 204.

Notably, for this example embodiment, the aiming symbol preferably used is a flight path marker symbol (flight path vector or velocity vector symbol). However, the present invention is not intended to be so limited, and any suitable symbol that represents the forces acting on an aircraft in flight, the track or direction of an aircraft in flight, and/or an aiming point for an aircraft in flight, can be used for an aiming symbol to be presented on a visual display (e.g., visual display 212) for aircraft control. Also, it is important to note that although the use of an aiming symbol is being described herein for illustrative purposes, the present invention also contemplates the use of any suitable symbol for aircraft control, which may be used to enhance the visibility of important flight information being shown on or seen through an aircraft's visual display.

Next, taking into account the current position of the aiming symbol (e.g., flight path marker 306) on the visual display, processing unit 202 executes one or more suitable algorithms to compute the length and position of a suitable segment or gap (e.g., gap 314) for a stroke symbol (e.g., zero pitch reference line 302) on the display (step 410). For example, in order to enhance the visibility of important flight information in the vicinity of flight path marker 306, which could be obscured by a section of zero pitch reference line 302 in that vicinity, processing unit 202 can generate suitable control signals for displaying a gap 314 on zero pitch reference line 302 with a length that is approximately equal to (e.g., slightly longer than) the width of flight path maker 306 (e.g., including the lengths of the horizontal bars directed outward from the circular portion of flight path marker 306). Thus, processing unit 202 can move gap 314 along zero pitch reference line 302 so that gap 314 follows the lateral movement of flight path marker 306 on the display. In this regard, processing unit 202 can send suitable control signals to a graphics generator (e.g., graphics display generator 210) or directly to the visual display (e.g., if a graphics generator is integrated into the display), which generates a suitable graphic symbol representing gap 314 on zero pitch reference line 302. Processing unit 202 also sends suitable control signals to the graphics generator or directly to the display (step 412), which adjusts (increases, for this example) the transparency of gap 314 in order to enhance the visibility of any important flight information (e.g., runway or other target, terrain features, etc.) that may be obscured in that vicinity by zero pitch reference line 302. For this illustrative example, it can be seen that processing unit 202 has made gap 314 semi-transparent, in order to increase the visibility of the underlying terrain 313 (and/or any other important flight information in this region).

Next, processing unit 202 determines the position of any other flight information (e.g., heading indicator symbols or other similar symbols) on the stroke symbol (e.g., zero pitch reference line 302) being displayed (step 414). For example, the position of this flight information on the zero pitch reference line can be retrieved from database 204. Processing unit 202 then determines whether or not any such flight information symbol is located within a predetermined distance from each end of (or, for example, from the center of) gap 314 (step 416). If processing unit 202 determines that such a flight information symbol is located within the predetermined distance from gap 314 (step 418), then processing unit 202 sends suitable control signals to the graphics generator 210 or directly to the visual display (step 420), which adjusts (increases, for this example) the transparency of gap 314 in order to enhance the visibility of any important flight information that may be obscured in that vicinity by the flight information symbol involved. For this illustrative example, it can be seen that processing unit 202 has made heading indicator symbol 304c semi-transparent, in order to increase the visibility of the underlying terrain 313 (and/or any other important flight information in this region) and still display the important heading information (e.g., "25"). However, returning to step 418, if processing unit 202 determines that no such flight information symbol (e.g., heading, course, track indicator) is located within the predetermined distance from gap 314, then the flow proceeds to step 422.

As such, processing unit 202 determines whether or not the stroke symbology (e.g., zero pitch reference line 302) being displayed coincides with any portion of a flight information tape or scale symbol (e.g., airspeed tape 310 and altitude tape 312) being displayed (step 422). For example, the location of such a flight information tape or scale (e.g., on the zero pitch reference line) can be retrieved from database 204. If processing unit 202 determines that no such flight information tape or scale symbol is coincidental with any portion of the stroke symbol (e.g., zero pitch reference line 302) being displayed (step 424), then the flow is terminated.

However, if (at step 424) processing unit 202 determines that such a flight information tape or scale symbol is coincidental with any portion of the stroke symbol (e.g., zero pitch reference line 302) being displayed, then processing unit 202 sends suitable control signals to the graphics generator 210 or directly to the visual display (step 426), which adjusts (increases, for this example) the transparency of the stroke symbology in the coincidental region, in order to enhance the visibility of any important flight information that may be obscured in that coincidental region by the stroke symbol involved. For this illustrative example, it can be seen that processing unit 202 has made zero pitch reference line 302 completely transparent in the regions where zero pitch reference line 302 coincides with airspeed tape 310 and altitude tape 312, in order to increase the visibility of the readings on these tapes, the underlying terrain 318, 320, and/or any other important flight information that might be displayed within this region.

Thus, in accordance with the principles of the present invention, a system and method are provided for increasing the visibility of important flight information on electronic displays, such as, for example, Primary Flight Displays, similar types of aircraft displays, or electronic displays for other types of vehicles. Advantageously, the present invention facilitates flight crew or operator situational awareness and vehicle control, which reduces pilot or operator workload and navigation errors, and thus results in increased aircraft and/or navigation safety.

It is important to note that while the present invention has been described in the context of a fully functioning visual display system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular visual display system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for increasing visibility of flight information on a visual display, comprising:
    a flight management information unit, said flight management information unit operable to determine at least one of a current position, direction, pitch and path of an aircraft;
    a data storage unit, said data storage unit operable to store target data and terrain data; and
    a processing unit coupled to said flight management information unit, said processing unit operable to:
    receive said at least one of current position, direction, pitch and path of said aircraft;
    receive said target data and said terrain data;
    generate a first plurality of control signals for a visual display, said first plurality of control signals representing a flight control symbol for said visual display;
    generate a second plurality of control signals for said visual display, said second plurality of control signals representing a second symbol for said visual display, said second symbol associated with said pitch of said aircraft;
    generate a third plurality of control signals for said visual display, said third plurality of control signals representing a gap in said second symbol for said visual display, said gap associated with a position of said flight control symbol on said visual display; and
    generate said third plurality of control signals for said visual display so as to adjust a transparency of said gap and enhance a visibility of at least one of said target data and said terrain data on said visual display.

2. The system of claim 1, wherein said processing unit is further operable to:
    generate a fourth plurality of control signals for said visual display so as to adjust a transparency of a portion of said second symbol, if said portion of said second symbol coincides with a flight information tape or scale on said visual display.

3. The system of claim 1, wherein said processing unit is further operable to:
    generate a fifth plurality of control signals for said visual display so as to adjust a transparency of at least one of a flight path direction symbol and scale on said visual display, if said flight path direction symbol is disposed on said visual display within a predetermined distance from an end of said gap on said visual display.

4. The system of claim 1, wherein the operation to receive said at least one of current position, direction, pitch and path of said aircraft, further comprises an operation to receive at least one of a vertical velocity or a lateral velocity of said aircraft.

5. The system of claim 1, wherein said flight control symbol comprises an aiming symbol.

6. The system of claim 1, wherein said flight control symbol comprises at least one of a flight path marker symbol, flight path vector symbol, or velocity vector symbol.

7. The system of claim 1, wherein said second symbol comprises a zero pitch reference line symbol.

8. The system of claim 1, wherein said second symbol comprises a horizon line symbol.

9. The system of claim 2, wherein said flight information tape comprises at least one of an airspeed tape symbol, altitude tape symbol, airspeed dial symbol, and airspeed digit box symbol.

10. The system of claim 1, wherein said visual display comprises a Heads-Down Display.

11. The system of claim 1, wherein said visual display comprises a Heads-Up Display that is operable to display a visual representation of said flight control symbol and enables an actual viewing of a target.

12. The system of claim 1, wherein said visual display comprises at least one of a Primary Flight Display, aircraft display, spacecraft display, unmanned air vehicle and ground station display, and display adapted for a submarine vehicle.

13. A display system for increasing visibility of flight information, comprising:
    means for receiving at least one of a current position, direction, pitch and path of an aircraft;
    means for receiving target data and terrain data;
    means for generating a first plurality of control signals for a visual display, said first plurality of control signals representing a flight path marker symbol for a visual display;
    means for generating a second plurality of control signals for said visual display, said second plurality of control signals representing a zero pitch reference line symbol for said visual display;
    means for generating a third plurality of control signals for said visual display, said third plurality of control signals representing a segment in said zero pitch reference line symbol for said visual display, said segment associated with a position of said flight path marker symbol on said visual display; and
    means for generating said third plurality of control signals for said visual display so as to adjust a transparency of said segment and enhance a visibility of at least said target data or said terrain data on said visual display.

14. The system of claim 13, further comprising:
    means for generating a fourth plurality of control signals for said visual display so as to adjust a transparency of a portion of said zero pitch reference line symbol, if said portion of said zero pitch reference line coincides with a flight information tape or scale symbol on said visual display.

15. The system of claim 13, further comprising:
means for generating a fifth plurality of control signals for said visual display so as to adjust a transparency of a heading indicator symbol on said visual display, if said heading indicator symbol is disposed on said visual display within a predetermined distance from an end of said segment on said visual display.

16. The system of claim 14, wherein said flight information tape or scale symbol comprises at least one of an airspeed tape symbol, altitude tape symbol, airspeed dial symbol and airspeed digit box symbol.

17. The system of claim 13, wherein said visual display comprises a Heads-Down Display.

18. The system of claim 13, wherein said visual display comprises a Heads-Up Display that is operable to display a visual representation of said zero pitch reference line symbol, and enables an actual viewing of a target.

19. The system of claim 13, wherein said visual display comprises a Primary Flight Display.

20. A method for increasing visibility of flight information on a visual display, comprising the steps of:
receiving at least one of a current position, direction, pitch and path of an aircraft;
receiving target data and terrain data;
generating a first plurality of control signals for the visual display, said first plurality of control signals representing a flight control symbol for said visual display;
generating a second plurality of control signals for said visual display, said second plurality of control signals representing a second symbol for said visual display, said second symbol associated with said pitch of said aircraft;
generating a third plurality of control signals for said visual display, said third plurality of control signals representing a gap in said second symbol for said visual display, said gap associated with a position of said flight control symbol on said visual display; and
adjusting a transparency of said gap so as to enhance a visibility of at least one of said target data and said terrain data on said visual display.

21. The method of claim 20, further comprising the step of:
adjusting a transparency of a portion of said second symbol, if said portion of said second symbol coincides with a flight information tape or scale on said visual display.

22. The method of claim 20, further comprising the steps of:
adjusting a transparency of a flight path direction symbol on said visual display, if said flight path direction symbol is disposed on said visual display within a predetermined distance from an end of said gap on said visual display.

23. The method of claim 20, wherein the adjusting step comprises a step of increasing said transparency of said gap.

24. A computer program product, comprising:
a computer-usable medium having computer-readable code embodied therein for configuring a computer processor, the computer program product comprising:
a first executable computer-readable code configured to cause a computer processor to receive at least one of current position, direction, pitch and path data for an aircraft;
a second executable computer-readable code configured to cause a computer processor to receive target data and terrain data;
a third executable computer-readable code configured to cause a computer processor to generate a first plurality of control signals for a visual display, said first plurality of control signals representing a flight control symbol for said visual display;
a fourth executable computer-readable code configured to cause a computer processor to generate a second plurality of control signals for said visual display, said second plurality of control signals representing a second symbol for said visual display, said second symbol associated with said pitch data for said aircraft;
a fifth executable computer-readable code configured to cause a computer processor to generate a third plurality of control signals for said visual display, said third plurality of control signals representing a gap in said second symbol for said visual display, said gap associated with a position of said flight control symbol on said visual display; and
a sixth executable computer-readable code configured to cause a computer processor to adjust a transparency of said gap so as to enhance a visibility of at least one of said target data and said terrain data on said visual display.

25. The computer program product of claim 24, further comprising:
a seventh executable computer-readable code configured to cause a computer processor to adjust a transparency of a portion of said second symbol, if said portion of said second symbol coincides with a flight information tape or scale symbol on said visual display.

26. The computer program product of claim 24, further comprising:
an eighth executable computer-readable code configured to cause a computer processor to adjust a transparency of a flight path direction symbol on said visual display, if said flight path direction symbol is disposed on said visual display within a predetermined distance from an end of said gap on said visual display.

* * * * *